United States Patent Office 2,843,523
Patented July 15, 1958

2,843,523
ANDROGENIC COMPOUNDS AND METHODS OF PREPARING THE SAME

Louis Freedman, Mount Vernon, and Seymour L. Shapiro, Hastings on Hudson, N. Y., assignors to U. S. Vitamin Corporation, New York, N. Y., a corporation of Delaware No Drawing. Application July 7, 1955
Serial No. 520,627

8 Claims. (Cl. 167—65)

This invention relates to new derivatives of the androgens, testosterone (otherwise known as "$\Delta^4$-androsten-17-$\beta$-ol-3-one"), and androstane-17($\beta$)ol-3-one, which sterols will sometimes be referred to hereinafter by the following generic structural formula:

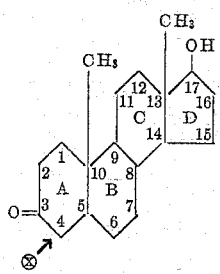

wherein X represents one of the group consisting of a double bond between the 4- and the 5- carbons and a single bond at this position with an H attached to the 5-carbon. In other words, the structures of the A ring of the generic formula for the respective sterols are:

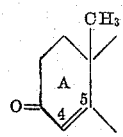 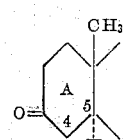

Testosterone    Androstane-17($\beta$)-ol-3-one the latter sterol also sometimes called "stanolone."

It is known that the androgenic activity of the above-mentioned sterols is sometimes increased when they are converted to esters, one example being the propionic acid ester of testosterone; but it was desirable for clinical significance and utility, considerably to augment the androgenic activity of these compounds and to obtain androgenic activity of longer duration than that of the ester or the sterol itself. This we have accomplished in accordance with the invention herein described.

Particularly, this invention relates to $\beta$-halogenated propionyl esters of said sterols; and for these new compounds the structure of the D ring of the generic formula may be shown as

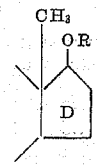

wherein R is a $\beta$-halogenated propionyl radicle. Specifically, the new compounds are:

the $\beta$ chloropropionate where R stands for

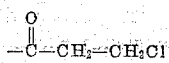

the $\beta$-bromopropionate where R stands for

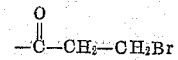

and the $\beta$-iodopropionate where R stands for

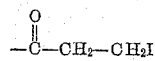

As will be later pointed out in detail, we have discovered that our new compounds, i. e., the $\beta$-halogenated propionates of these sterols, have surprisingly enhanced androgenic activity over either of the sterols or testosterone propionate. The specificity of the beta position of the halogen is important with respect to prolonged androgenic activity since it is known that testosterone $\alpha$-chloropropionate provides an androgenic response inferior to testosterone propionate itself.

Our invention also encompasses new compositions for parenteral administration comprising sterile solutions of our new compounds in a non-toxic fatty ester; such as a glyceride oil, with or without the addition of a preservative to prevent bacterial growth.

Our invention includes the provision of novel processes of making our new products.

These may be broadly stated as reacting the androgen with a $\beta$-halopropionyl chloride in the presence of a tertiary base such as pyridine, or other suitable acid acceptor.

The following examples are illustrative of the process for preparing $\beta$-halo-propionyl $\Delta^4$-androsten-17-$\beta$-oxy-3-one and androstane-17-$\beta$-oxy-3-one derivatives although it is to be understood that modification may be made within the scope of the appended claims. The androgen derivatives thus processed have the structural formula

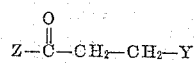

where Z is a member of the group consisting of $\Delta^4$-androsten-17-$\beta$-oxy-3-one and androstane-17-$\beta$-oxy-3-one and Y is halogen.

EXAMPLE 1.—TESTOSTERONE-$\beta$-CHLOROPROPIONATE

A solution of 70 ml. of $\beta$-chloropropionylchloride in 600 ml. of dry toluene was cooled to $-10°$ C. A solution of 24 g. of testosterone in 200 ml. of dry pyridine and 800 ml. of toluene was added dropwise with stirring and continued cooling. After the addition was complete the mixture was maintained at room temperature and stirred for an additional time of about 20 hours. After addition of 350 ml. of water, the toluene layer was separated and successively washed with water, dilute hydrochloric acid, a dilute solution of sodium bicarbonate, and finally with water.

The toluene solution was then dried with anhydrous magnesium sulphate, filtered and the filtrate concentrated, in vacuo. The solid residue was dried in vacuo at about 80° C. and recrystallized from heptane.

Testosterone $\beta$-bromopropionate and the analogous iodo-compound can be made in the same way; although we have found it more simple to make the latter by replacement, in accordance with the following example.

EXAMPLE 2.—TESTOSTERONE-$\beta$-IODOPROPIONATE

This compound was prepared from the bromo ester by replacement of the bromine by iodine, as follows:

One gram of testosterone-$\beta$-bromopropionate was dissolved in 5 ml. of acetone, and 50 ml. of a 15% sodium-iodide-in-acetone solution was added. After standing for 2 days, the sodium bromide was filtered off. The filtrate was concentrated to 25 ml. and diluted with 100 ml. of water. Upon standing, crystals formed which were separated, dried in vacuo and recrystallized from heptane.

The testosterone derivatives produced as above were each in the form of white crystals, the respective yields, melting points and analyses being as follows:

*Testosterone-β-chloropropionate*

Yield, 65% of theoretical; M. P., 154–154.5° C.
Analysis.—Calcd. for $C_{22}H_{31}O_3Cl$: C, 69.7; H, 8.2. Found: C, 69.2; H, 8.2.

*Testosterone-β-bromopropionate*

Yield, 67% of theoretical; M. P., 153–153.5° C.
Analysis.—Calcd. for $C_{22}H_{31}O_3Br$: C, 62.4; H, 7.34. Found: C, 61.93; H, 7.61.

*Testosterone-β-iodopropionate*

Yield, 75% of theoretical; M. P., 140° C. with decomposition.
Analysis.—Calcd. for $C_{22}H_{31}O_3I$: C, 56.2; H, 6.6. Found: C, 57.37; H, 6.69.

The corresponding β-halopropionate esters of stanolone were prepared in a similar manner using stanolone instead of testosterone, an example corresponding to Example 1 above being as follows:

EXAMPLE 3.—STANOLONE-β-CHLOROPROPIONATE

A solution of 9 ml. of β-chloropropionyl chloride in 120 ml. of dry toluene was cooled to −10° C. A solution of 5 g. of stanolone in 150 ml. of dry toluene, and 10 ml. of dry pyridine was added dropwise with stirring to the cooled mixture. After the addition was completed, the reaction was maintained at room temperature with stirring for 18 hours. After addition of 120 ml. of water, the toluene layer was separated, and washed as described in Example 1. The toluene solution was then dried over anhydrous magnesium sulphate, filtered and the filtrate concentrated to dryness in vacuo. The residue was recrystallized from heptane.

In the case of the stanolone compounds also, the products obtained were each in the form of white crystals, with the following results:

*Stanolone-β-chloropropionate*

Yield, 60% of theoretical; M. P., 102–104° C.
Analysis.—Calcd. for $C_{23}H_{33}O_3Cl$: C, 69.38; H, 8.67. Found: C, 69.40; H, 8.73.

*Stanolone-β-bromopropionate*

Yield, 40% of theoretical; M. P., 83.5–84.5° C.
Analysis.—Calcd. for $C_{23}H_{33}O_3Br$: C, 62.11; H, 7.76. Found: C, 62.07; H, 7.75.

*Stanolone-β-iodopropionate*

Yield, 48% of theoretical; M. P., 84.5–85.5° C.
Analysis.—Calcd. for $C_{23}H_{33}O_3I$: C, 55.93; C, 6.99. Found: C, 56.39; H, 6.75.

For therapeutic use, oil solutions of the halo-esters described above can be prepared by dissolving the ester in a non-toxic fatty ester, or glyceride oil suitable for parenterial administration such as corn oil, safflower oil, peanut oil, cottonseed oil, sesame oil, ethyl oleate and the like. The finely powdered esters dissolve directly in the oil, upon gentle warming and stirring.

EXAMPLE 4.—OIL SOLUTIONS OF HALO ESTERS

A charge of 3.1 g. of testosterone-β-bromopropionate (finely powdered) is added to 100 ml. of corn oil and the mixture warmed gently to effect solution. The clear oil solution, containing 31 mg. of testosterone-β-bromopropionate per milliliter, may be rendered sterile by filtration through a Selas (or equivalent) bacterial filter, and may be treated for purposes of preservation with 5 mg. of chlorobutanol per milliliter of solution.

In a similar manner, corn oil solutions suitable for injection have been prepared of testosterone-β-iodopropionate, and testosterone-β-chloropropionate; and of the β-chloropropionate, β-bromopropionate, and β-iodopropionate of stanolone. Or, if desired, solutions of the β-halopropionates may be made in ethyl oleate. Such solvents will be herein referred to generally as "non-toxic fatty esters."

Typical solutions in oil for experimental and therapeutic use have been prepared by dissolving the following quantities of the new esters of this invention in 100 cc. of the fatty ester:

| | Grams |
|---|---|
| Testosterone-β-chloropropionate | [1] 2.77 |
| Testosterone-β-bromopropionate | [1] 3.10 |
| Testosterone-β-iodopropionate | [1] 3.44 |

[1] Weight equivalent to 25 mg. of testosteronepropionate/cc.

| | Grams |
|---|---|
| Stanolone-β-chloropropionate | [2] 2.79 |
| Stanolone-β-bromopropionate | [2] 3.12 |
| Stanolone-β-iodopropionate | [2] 3.46 |

[2] Weight equivalent to 21 mg. of stanolone/cc.

The androgenic activities of these β-halogenated propionates as compared to the previously known un-halogenated compounds, on the comparative weight basis above indicated, were determined by the increase in the weights of the seminal vesicles and the anterior prostate respectively of castrated rats after 11 to 22 days in the tests with the testosterone compounds, and after 7 to 33 days with the stanolone compounds, respectively. The weights are expressed as milligrams of glands per kilogram of body weight at the time of sacrificing the animals.

Composite results for the testosterone compounds are shown in Table I, in which castrated mature rats were injected subcutaneously on the first day of the test with a quantity of the respective compounds corresponding to 7.5 mg. per rat of testosterone dissolved in corn oil. At the end of each period of days indicated, three of the animals were sacrificed and the seminal vesicles and anterior prostate glands excised and weighed.

TABLE I

| Compound | Wt. of Seminal Vesicles in mg./kg. on Day Post Injection | | | | | Wt. of Anterior Prostate in mg./kg. on Day Post Injection | | | | |
|---|---|---|---|---|---|---|---|---|---|---|
| | 11 | 15 | 19 | 22 | Percent Increase After 11 Days | 11 | 15 | 19 | 22 | Percent Increase After 15 Days |
| Testosterone-propionate | 1,631 | 1,154 | 637 | 527 | Control (0) | 898 | 1,102 | 599 | 295 | Control (0) |
| Testosterone-β-chloropropionate | 3,280 | 1,522 | 596 | 922 | 101 | 1,292 | 1,520 | 468 | 839 | 38 |
| Testosterone-β-bromopropionate | 3,708 | 2,966 | 2,245 | 836 | 126 | 1,013 | 1,624 | 1,125 | 644 | 48 |
| Testosterone-β-iodopropionate | 3,371 | 2,742 | 1,961 | 1,263 | 107 | 1,178 | 1,282 | 1,427 | 907 | 17 |

Table II shows composite results obtained with the stanolone compounds. In this series of tests the amount of the respective ester injected corresponded to 5 mg. of stanolone per rat. Two animals were sacrificed at the end of each designated period and the seminal vesicles and anterior prostate glands excised and weighed.

TABLE II

| Compound | Wt. of Seminal Vesicles in mg./kg. on Day Post Injection | | | | | Wt. of Anterior Prostate in mg./kg. on Day Post Injection | | | | |
|---|---|---|---|---|---|---|---|---|---|---|
| | 7 | 15 | 26 | 33 | Percent Increase After 15 Days | 7 | 15 | 26 | 33 | Percent Increase After 15 Days |
| Stanolone | 620 | 265 | 93 | 96 | Control (0) | 547 | 361 | 73 | 39 | Control (0) |
| Stanolone-β-chloropropionate | 522 | 1,530 | 970 | 765 | 478 | 418 | 1,260 | 784 | 685 | 250 |
| Stanolone-β-bromopropionate | 556 | 1,560 | 1,125 | 584 | 487 | 336 | 1,280 | 848 | 965 | 254 |
| Stanolone-β-iodopropionate | 614 | 1,370 | 973 | 757 | 418 | 480 | 1,202 | 1,195 | 815 | 232 |

From the above it will be apparent that esterification of these sterols with a β-halogenated propionic acid results in an enhanced activity surprisingly greater than that of the ester, which itself is more active than the sterol alcohol. For example, testosterone β-halopropionates which we have prepared were found to give far greater and more prolonged androgenic response than testosterone propionate. Likewise, the β-halopropionates of stanolone gave a greater and more prolonged response than did stanolone.

A typical dose as used clinically is 25–50 mg. of our new androgen derivative parenterally administered as a sterile corn oil solution processed as described above.

What we claim is:

1. Androgen derivatives which are a member of the group consisting of

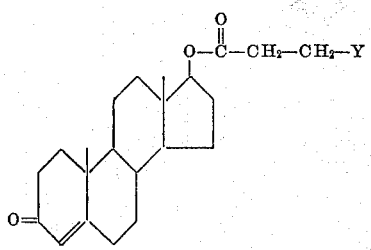

and

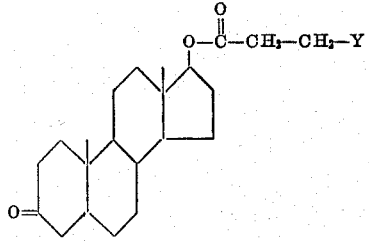

where Y is halogen.

2. Testosterone β-chloropropionate.
3. Testosterone β-bromopropionate.
4. Testosterone β-iodopropionate.
5. Androstane-17-β-ol-3-one β-chloropropionate.
6. Androstane-17-β-ol-3-one β-bromopropionate.
7. The process of making compounds claimed in claim 1, which comprises reacting the androgen with the β-halogenated propionyl chloride and in the presence of an acid aceeptor such as pyridine, and recovering the β-halogenated propionate of the androgen.
8. Therapeutic compositions suitable for parenteral administration, comprising a sterile solution of any compound claimed in claim 1, in an non-toxic fatty ester.

References Cited in the file of this patent

UNITED STATES PATENTS

| | | |
|---|---|---|
| 2,109,400 | Miescher | Feb. 22, 1938 |
| 2,566,358 | Ott | Sept. 4, 1951 |

OTHER REFERENCES

Dordoni: Chem. Abst. 46, column 5068 (1952).
Gallinovsky: Monatsh., 84, 193–8 (1953).